United States Patent
Tsuchiya et al.

(10) Patent No.: US 12,345,387 B2
(45) Date of Patent: Jul. 1, 2025

(54) LIGHTING TOOL FOR VEHICLES

(71) Applicant: Ichikoh Industries, Ltd., Isehara (JP)

(72) Inventors: Takaaki Tsuchiya, Isehara (JP); Kenji Matsuoka, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/575,958

(22) PCT Filed: Jun. 20, 2022

(86) PCT No.: PCT/JP2022/024521
§ 371 (c)(1),
(2) Date: Jan. 2, 2024

(87) PCT Pub. No.: WO2023/282041
PCT Pub. Date: Jan. 12, 2023

(65) Prior Publication Data
US 2024/0369203 A1   Nov. 7, 2024

(30) Foreign Application Priority Data

Jul. 6, 2021  (JP) ................................. 2021-112418

(51) Int. Cl.
*F21S 43/19* (2018.01)
*F21S 41/141* (2018.01)
(Continued)

(52) U.S. Cl.
CPC ............ *F21S 45/47* (2018.01); *F21S 41/141* (2018.01); *F21S 41/192* (2018.01); *F21S 43/14* (2018.01); *F21S 43/195* (2018.01)

(58) Field of Classification Search
CPC ...... F21S 41/192; F21S 43/195; F21S 41/141; F21S 43/14; F21S 45/47; F21V 29/713;
(Continued)

(56) References Cited

U.S. PATENT DOCUMENTS

2003/0189830 A1* 10/2003 Sugimoto ........... H01L 25/0753
362/267
2007/0291503 A1* 12/2007 Friedrich ............ H01L 25/0753
362/545
(Continued)

FOREIGN PATENT DOCUMENTS

EP   3 190 334 A1   7/2017
EP   3 392 553 A1   10/2018
(Continued)

OTHER PUBLICATIONS

International Search Report mailed on Aug. 30, 2022 in PCT/JP2022/024521 filed on Jun. 20, 2022, (2 pages).
(Continued)

*Primary Examiner* — Omar Rojas Cadima
(74) *Attorney, Agent, or Firm* — Oblon, McClelland, Maier & Neustadt, L.L.P.

(57) ABSTRACT

It is desirable that light functions such as a daytime running lamp, a positioning lamp, and a turn indicator lamp each take an optimal heat dissipation structure. A first light function and a second light function for executing light functions such as a daytime running lamp, a positioning lamp, and a turn indicator lamp are executed by LEDs each including a light source, protection resin, and a light source plate. An LED for the first light function is provided on an upper surface of a heatsink, and an LED for the second light function is provided on a substrate separate from the heatsink. The substrate is mounted at a position on the upper surface of the heatsink so that the first light function and the second light function are respectively performed.

10 Claims, 7 Drawing Sheets

(51) Int. Cl.
    *F21S 41/19* (2018.01)
    *F21S 43/14* (2018.01)
    *F21S 45/47* (2018.01)

(58) Field of Classification Search
    CPC .......... F21V 29/83; F21V 29/89; F21V 29/10; F21V 29/503; H05K 3/0061; H05K 2201/09054; H05K 2201/09063; H05K 2201/09072
    See application file for complete search history.

(56) References Cited

U.S. PATENT DOCUMENTS

| | | | |
|---|---|---|---|
| 2010/0188852 A1* | 7/2010 | Sanpei | H05K 1/0203 362/294 |
| 2017/0198879 A1 | 7/2017 | Martinez-Perez et al. | |

FOREIGN PATENT DOCUMENTS

| | | |
|---|---|---|
| JP | 2011-253774 A | 12/2011 |
| JP | 2016-134313 A | 7/2016 |
| JP | 2017-098212 A | 6/2017 |
| JP | 2019-169358 A | 10/2019 |
| JP | 2021-093332 A | 6/2021 |
| WO | WO 2013/153938 A1 | 10/2013 |

OTHER PUBLICATIONS

Extended European Search Report issued Dec. 20, 2024, in corresponding European Patent Application No. 22837458.3, 9 pages.
Japanese Office Action issued on Oct. 8, 2024 in Japanese Patent Application No. 2021-112418 (with unedited computer-generated English translation), 11 pages.
Japanese Office Action issued Feb. 4, 2025 in Japanese Patent Application No. 2021-112418 (with English translation), 9 pages.

* cited by examiner

LIGHTING TOOL FOR VEHICLES

TECHNICAL FIELD

The present invention relates to a lighting tool for vehicles, and in particular to a lighting tool for vehicles having various light functions modularized.

BACKGROUND ART

Lighting tools for vehicles are required to use light sources with high output and high luminance and need to dissipate heat from the light sources efficiently. For example, in socket type light devices, many measures have been made for heat dissipation (see, for example, PTL 1).

CITATION LIST

Patent Literature

PTL 1: Japanese Patent Application Publication No. 2011-253774

SUMMARY OF THE INVENTION

Problems to be Solved by the Invention

Various light functions such as daytime running lamps (DRLs), positioning lamps (PLs), and turn indicator lamps (TIL) are incorporated in such light devices, and although the frequency of use, timing of use, required luminous intensity, and the like, of these light functions are different, there are no background arts that have designed a heat dissipation structure while focusing on the characteristics of such light functions.

Therefore, it is desirable to have optimal heat dissipation structures for various light functions.

The purpose of the present invention is to provide a light module used for a lighting tool for vehicles while focusing on the characteristics of various light functions.

Means for Solving the Problem

A light module used for a lighting tool for vehicles according to the present invention includes a first light function provided on an upper surface of a heatsink and a second light function provided on a substrate which is separate from the heatsink, and the substrate is mounted at a position on the upper surface of the heatsink so that the first light function and the second light function are respectively performed.

The substrate includes an opening at a position other than an area where the second light function is provided, and the first light function is performed through the opening. Furthermore, a projected portion is formed on the upper surface of the heatsink, the first light function is provided on an upper surface of the projected portion, and the substrate is mounted on the upper surface of the heatsink so that the projected portion is fit to the opening.

A length of the projected portion in a perpendicular direction is substantially same as a thickness of the substrate and the first light function and the second light function are positioned substantially at a same height in a perpendicular direction. The first light function is a daytime running lamp (DRL) and/or a positioning lamp (PL), and the second light function is a turn indicator lamp (TIL).

The first light function and the second light function are performed by LEDs having light sources, protection resin, and light source plates. A bottom surface of the light source plate for the first light function is attached to the upper surface of the heatsink with glue, and a bottom surface of the light source plate for the second light function is attached to an upper surface of the substrate by soldering. The light source for the first light function is power-supplied through an electrode provided on an upper surface of the light source plate for the first light function, and the light source for the second light function is power-supplied through a soldered area.

Such a light module used for a lighting tool for vehicles is also applicable to a socket type light device including a heat dissipation fin including resin, and in this case, the heatsink of the light module includes aluminum and a plurality of heat dissipation fins extending from a surface of the heatsink, the surface of the heatsink being opposite to the upper surface of the heatsink, and inside of the socket type light device is molded by injection so that the heat dissipation fin is accommodated within the inside of the socket type light device.

Furthermore, a connector for power-supplying from an outside source is provided on the substrate, and the first light function and the second light function may be power-supplied through the connector.

Effect of the Invention

With the light module used for the lighting tool for vehicles according to the present invention, the heat dissipation structures corresponding to various light functions may be used.

MODE FOR CARRYING OUT THE INVENTION

An embodiment of a light module used for a lighting tool for vehicles according to the present invention will be described below with reference to the drawings.

First Embodiment

Figure 1:
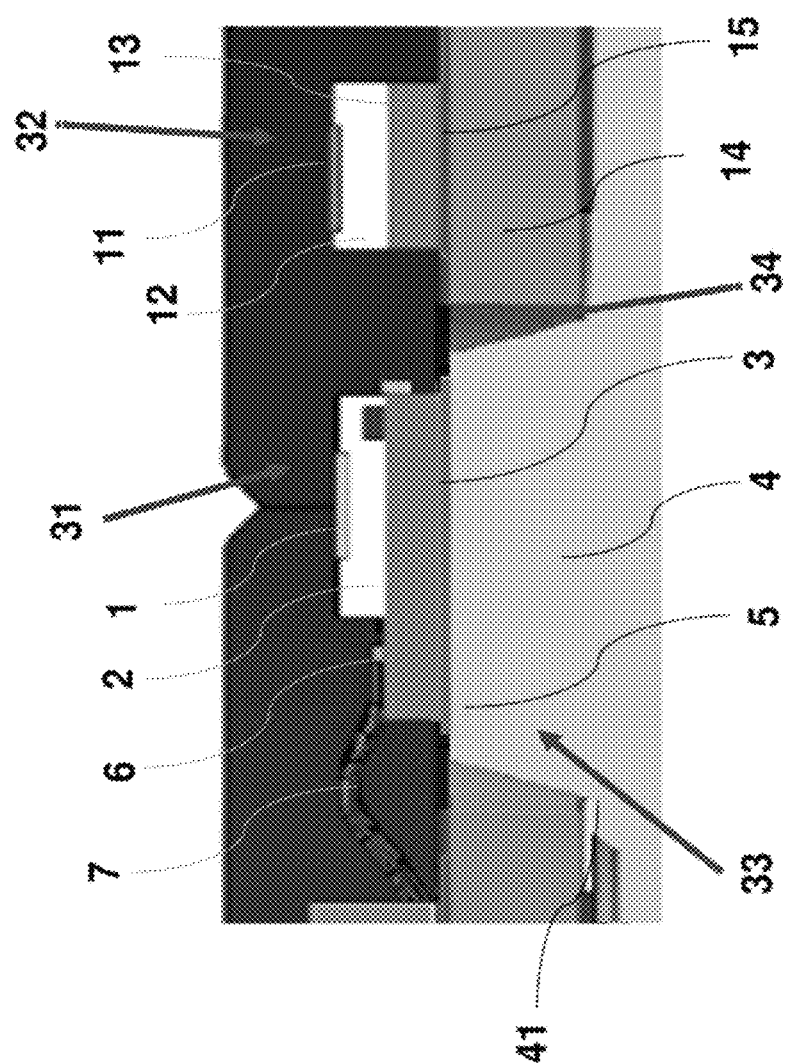
FIG. 1 is a cross-sectional view of a light module used for a lighting tool for vehicles according to an embodiment of the present invention.

FIG. 1 is a cross-sectional view of a light module used for a lighting tool for vehicles according to a first embodiment. A white LED 31 includes a light source 1, protection resin 2, and a light source plate 3, and the LED 31 performs a first light function. The LED 31 is mounted on a projected portion 33 formed on an upper surface 41 of a heatsink 4. A bottom surface of the light source plate 3 is attached to an upper surface on the projected portion 33 formed on the upper surface 41 of the heatsink 4 with glue 5. In this manner, the LED 31 is mounted on the heatsink 4 by what is called sub mounting. An electrode 6 is provided on the upper surface of the light source plate 3, a wire 7 is connected to the electrode 6, and the light source 1 is power-supplied through the wire 7 and the electrode 6.

An LED 32 includes a light source 11, protection resin 12, and a light source plate 13, and the LED 32 performs a second light function. The LED 32 is mounted on an upper surface of a substrate 14. A bottom surface of the light source plate 13 is attached to an upper surface of the substrate 14 by soldering 15. The light source 11 is power-supplied through the soldering 15.

The substrate 14 includes an opening 34 at a position other than an area where the LED 32 of the substrate 14 is provided as the second light function, and the substrate 14 is mounted on the heatsink 4 in a state where the projected portion 33 formed on the upper surface 41 of the heatsink 4 is fit to the opening 34. The upper surface 41 of the heatsink 4 is attached to a bottom surface of the substrate 14 with glue (or adhesive sheet) 17.

The height of the projected portion 33 in a perpendicular direction is approximately 1.1 mm, and the thickness of the substrate 14 is 1 mm. Therefore, the LED 31 and the LED 32 are positioned substantially at the same height in the perpendicular direction, and the upper surface of the light source 1 and the upper surface of the light source 11 may be arranged substantially flush.

Figure 2:
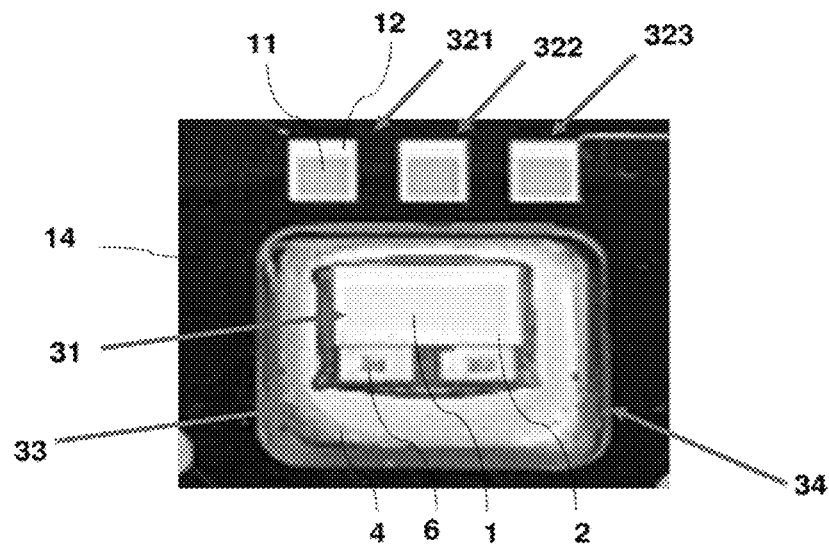
FIG. 2 is a plan view of the light module used for the lighting tool for vehicles according to the embodiment of the present invention when viewed from above.

FIG. 2 is a plan view of the light module used for the lighting tool for vehicles according to the present invention when viewed from above. The LED 31 is a single LED and functions as a daytime running lamp (DRL) or a positioning lamp (PL). One LED performs both functions, which may be achieved by adjusting the amount of current supplied to the LED 31 by PWN so that the amount of supplied current for the daytime running lamp (DRL) is less than that supplied for the positioning lamp (PL).

Next, as the second light function, a turn indicator lamp includes three amber LEDs 321, 322, and 323. Specifically, the three LEDs 321, 322, and 323 sequentially light up in the direction in which the car is turning and thus functions as a lamp to indicate the direction in which the car is traveling.

Typically, LEDs that function as daytime running lamps (DRLs) light up with a large amount of current for a long period of time, which causes a large amount of heat generated by lighting and leads to the necessity of design to have a more desirable heat dissipation efficiency. According to the present embodiment, light functions such as daytime running lamps (DRLs) are sub-mounted (directly attached with glue, etc.) on the heatsink, which allows for much higher heat dissipation effect. Conversely, light functions such as turn indicator lamps, which light up only when necessary, do not require much consideration of heat dissipation efficiency and may be attached to the substrate by soldering.

In the description according to the present embodiment, daytime running lamps (DRLs) and positioning lamps (PLs) are used as examples of the first light function, and turn indicator lamps as examples of the second light function, but other light functions (e.g., clearance lamps) may also be applied in the same way as in the present embodiment. Conversely, the first light function may be a turn indicator lamp and the second light function may be a daytime running lamp (DRL) or a positioning lamp (PL) depending on changes in lamp specifications.

According to the present embodiment, the substrate 14 includes the opening 34, but the substrate 14 may have any other form as long as its shape or arrangement does not interfere with the first light function. Furthermore, according to the present embodiment, the projected portion 33 is formed on the upper surface of the heatsink 4 and the LED 31 is provided on the upper surface of the projected portion 33 so that the positions of the light sources 1 and 11 are matched in the perpendicular direction, but the substrate 14 may be provided, in which the upper surface 41 of the heatsink 4 is flat and the LED 32 is mounted at a position on the upper surface 41 other than the area where the LED 31 is provided.

Application Example 1

Figure 3:
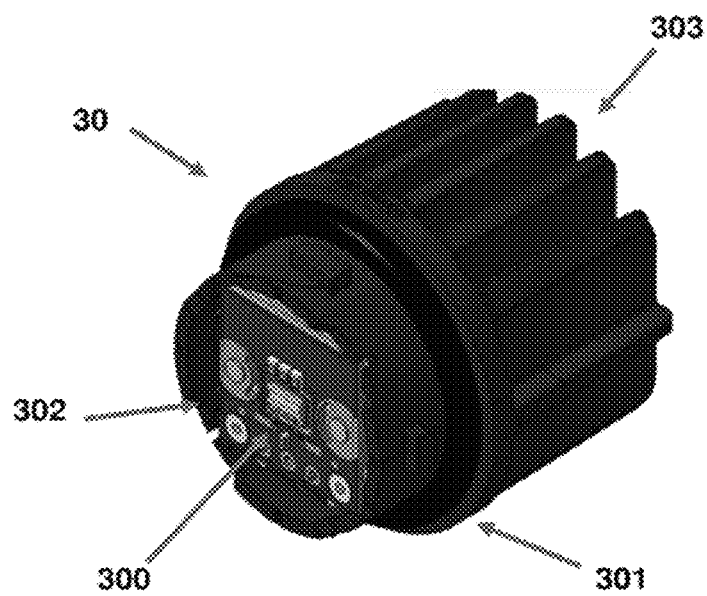
FIG. 3 is a perspective view of a socket type light device 30 to which a light module 300 according to the present invention is applied.

Examples of the application of the light module according to the present invention to socket type light devices will be described with reference to FIGS. 3 to 6. FIG. 3 is a perspective view of a socket type light device 30 to which a light module 300 according to the present invention is applied, FIG. 4 is a partially enlarged view of a portion of the light module 300, FIG. 5 is a cross-sectional view of the socket type light device 30, and FIG. 6 is a partially enlarged cross-sectional view of a portion of the light module 300.

In the socket type light device 30 illustrated in FIG. 3, one side surface of a flange 301 is provided with a mounting surface 302 on which the light module 300 is mounted, and the opposite side surface is provided with a plurality of fins 303 including resin to dissipate the heat generated from the light device 30.

Figure 4:
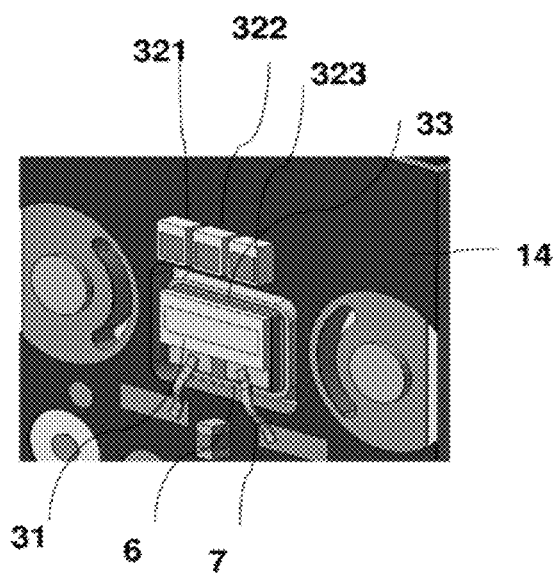
FIG. 4 is a partially enlarged view of the light module 300.

FIG. 4 is an enlarged view of the portion of the light module, where the LED 31 sub-mounted on the heatsink 4 is exposed through the opening 34 provided in the substrate 14 attached to the mounting surface 302. Power is supplied to the electrode 6 provided on a protection plate of the LED 31 through the wire 7. The LEDs 321 to 323 are attached onto the substrate 14 by soldering and are power-supplied through the soldering.

Figure 5:
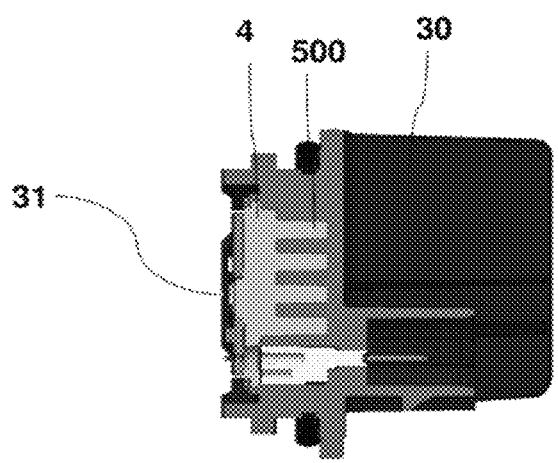
FIG. 5 is a cross-sectional view of the socket type light device 30.
Figure 6:
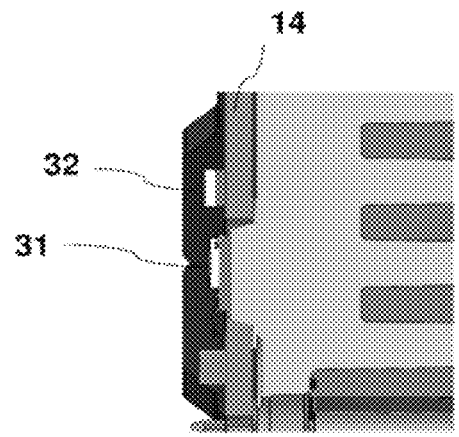
FIG. 6 is a partially enlarged cross-sectional view of the light module 300.

In FIG. 5, the heatsink 4 includes a plurality of heat dissipation fins 500 including aluminum on the opposite side of the surface where the LED 31 is mounted, and the heatsink 4 is incorporated into the socket type light device 30 including resin. The entire container of the socket type light device 30 is molded by injection, and the inside thereof is molded to receive the plurality of heat dissipation fins 500 of the heatsink 4 and, similarly, the heat dissipation fins 303 on the outer side are also molded by injection.

The material of the heatsink may be copper having high thermal conductivity, or may be magnesium or resin although its thermal conductivity is not as high as aluminum. That is, a heatsink including resin may be used.

FIG. 6 is an enlarged cross-sectional view of the portion of the light module. The one white LED 31, which serves as a daytime running lamp or a positioning lamp, is submounted (fixed with glue) on the projected portion (corresponding to the projected portion 33 in FIG. 1) of the heatsink 4, and the three amber LEDs 32, which serve as turn indicator lamps, are attached to the substrate 14 by soldering.

Figure 7:
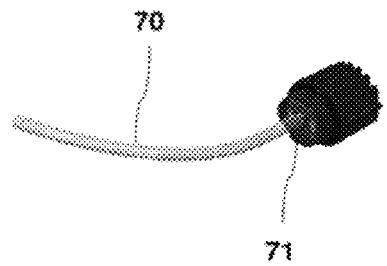
FIG. 7 is a diagram illustrating how the light generated by the socket type light device 30 is guided.

FIG. 7 is a diagram illustrating how the light generated by the socket type light device 30 is guided. A light guide 70 is provided so that one end face 71 thereof faces the light emitting surfaces of the LEDs 31, 321, 322, and 323. The light thus guided by the light guide 70 is used as a daytime running lamp (DRL), a positioning lamp (PL), or a turn indicator lamp (TIL) in the vehicle.

Application Example 2

Figure 8:
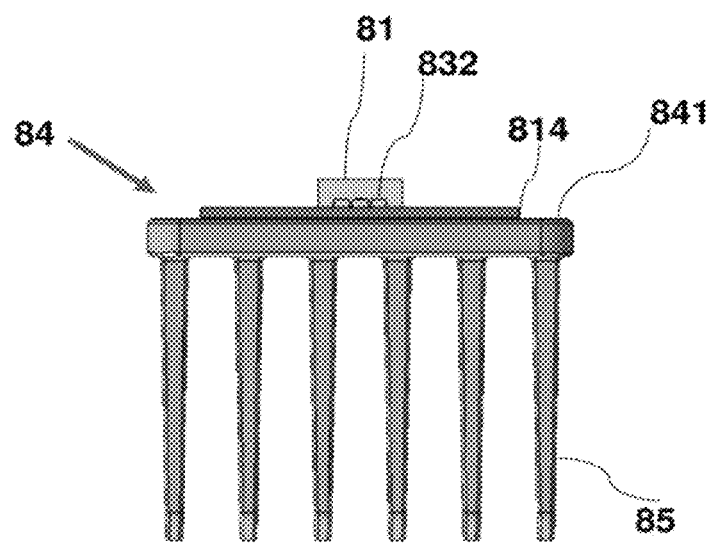
FIG. 8 is a side view of a heatsink 84 with a substrate 814 attached thereto.
Figure 9:
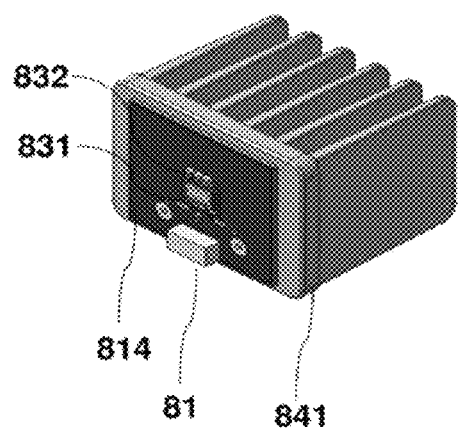
FIG. 9 is a perspective view of the heatsink 84 with the substrate 814 attached thereto.
Figure 10:
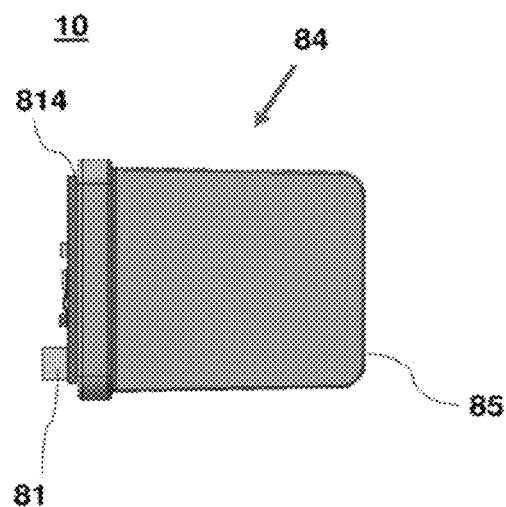
FIG. 10 is a side view of the heatsink 84 with the substrate 814 attached thereto when viewed from another direction.
Figure 11:
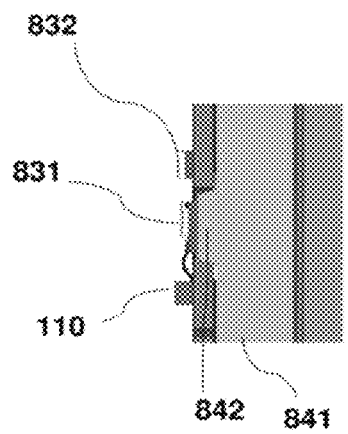
FIG. 11 is a partially enlarged cross-sectional view of FIG. 10.

With reference to FIGS. 8 to 11, a description will be given of an application example in a case where a heatsink, on which the light module according to the present invention is mounted, has a substantially rectangular light module mounting surface and is used as it is in a lighting tool for vehicles. FIG. 8 is a side view of a heatsink 84 with a substrate 814 attached thereto, FIG. 9 is a perspective view of the heatsink 84 with the substrate 814 attached thereto, FIG. 10 is a side view of the heatsink 84 with the substrate 814 attached thereto when viewed from another direction, and FIG. 11 is a partially enlarged cross-sectional view of FIG. 10.

In FIGS. 8 and 9, a top plate 841 of the heatsink 84 is substantially rectangular in shape, and the substrate 814 is attached to the top plate 841 with glue or an adhesive sheet. On the upper surface of the substrate 814, a connector 81 for power supply and three LEDs 832 for turn indicator lamps are mounted. Through the connector 81, power is supplied to one LED 831 for a daytime running lamp or positioning lamp and the three LEDs 832 for the turn indicator lamps. The heatsink 84 includes aluminum, and six heat dissipation fins 85 extending from the surface of the top plate 841, which is opposite to the light module mounting surface of the top plate 841, also include aluminum.

In FIGS. 10 and 11, a large-shaped projected portion 842 is formed at substantially the center of the top plate 841 of the heatsink 84, and the one LED 831 is attached to an end face of the projected portion with glue, etc. An electrode (equivalent to the electrode 6 in FIG. 1) provided on the LED 831 is electrically connected to an electronic circuitry on the substrate 814 through a wire 111 and an electrode 110 soldered on the substrate, and the electronic circuitry is power-supplied through the connector 81.

Application Example 3

Figure 12:
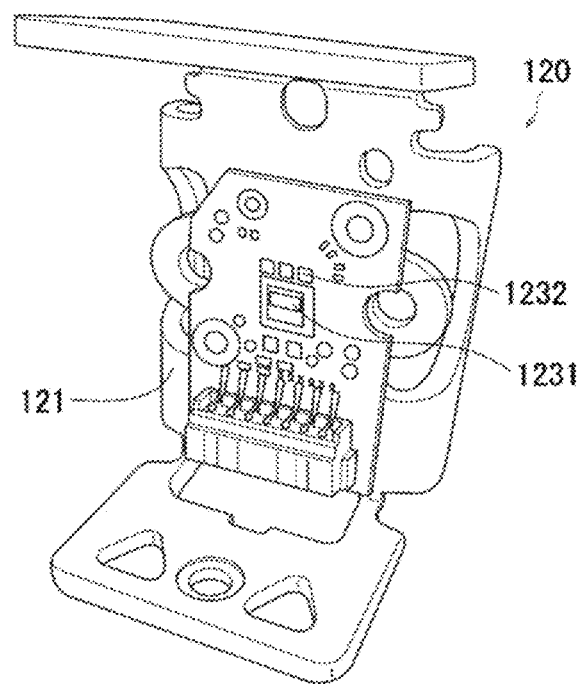
FIG. 12 is a diagram illustrating an example of application of the light module according to the present invention to a frame for a lighting tool for vehicles called LAG.

FIG. 12 is a diagram illustrating an example of application of the light module according to the present invention to a frame for a lighting tool for vehicles called LAG. Three amber LEDs 1232 for turn indicator lamps are soldered to an electronic circuit board 121 attached to an LAG 120, and one LED 1231 for a daytime running lamp or a positioning lamp is attached to an end face of a projected portion (equivalent to the projected portion 842 in FIG. 11) of a heatsink plate, which is attached to a back surface of the LAG and includes aluminum, with glue, etc.

DESCRIPTION OF REFERENCE NUMERALS

1 . . . . Light source
2 . . . . Protection resin
3 . . . . Light source plate
4 . . . . Heatsink
41 . . . . Upper surface
5 . . . . Glue
6 . . . . Electrode
7 . . . . Wire
11 . . . . Light source
12 . . . . Protection resin
13 . . . . Light source plate
14 . . . . Substrate
15 . . . . Soldering
17 . . . . Glue (or adhesive sheet)
31 . . . . LED
32 . . . . LED
33 . . . . Projected portion
34 . . . . Opening

The invention claimed is:

1. A light module used for a lighting tool for vehicles, comprising:
a first light function provided on an upper surface of a heatsink;
a second light function provided on a substrate which is separate from the heatsink;
wherein
the first light function is such a function that generates a larger amount of heat by lighting than the second light function,
the substrate is mounted at a position on the upper surface of the heatsink so that the first light function and the second light function are respectively performed, the heatsink dissipates heat generated from the first light function, without through the substrate and dissipates heat generated from the second light function through the substrate, and the first light function and the second light function are positioned substantially at a same height in a perpendicular direction.

2. The light module of claim 1 wherein the substrate includes an opening at an area other than an area where the second light function is provided and wherein the first light function is performed through the opening.

3. The light module of claim 2 wherein a projected portion is formed on the upper surface of the heatsink and the first light function is provided on an upper surface of the projected portion and wherein the substrate is mounted on the upper surface of the heatsink so that the projected portion is fit to the opening.

4. The light module of claim 3 wherein a length of the projected portion in a perpendicular direction is substantially same as a thickness of the substrate.

5. The light module of claim 1 wherein the first light function is a daytime running lamp (DRL) and/or a positioning lamp (PL), the first light function including a white LED and wherein the second light function is a turn indicator lamp (TIL), the second light function including an amber LED.

6. The light module of claim 1 wherein the first light function and the second light function are performed by LEDs having light sources, protection resin, and light source plates.

7. The light module of claim 6 wherein a bottom surface of the light source plate for the first light function is attached to the upper surface of the heatsink with glue and wherein a bottom surface of the light source plate for the second light function is attached to an upper surface of the substrate by soldering.

8. The light module of claim 7 wherein the light source for the first light function is power-supplied through an electrode provided on an upper surface of the light source plate for the first light function and wherein the light source for the second light function is power-supplied through an area having undergone the soldering.

9. A socket type light device comprising:
the light module used for the lighting tool for vehicles of claim 1;
a heat dissipation fin including resin;
wherein the heatsink includes aluminum and a plurality of heat dissipation fins extending from a surface of the heatsink, the surface of the heatsink being opposite to the upper surface of the heatsink; and wherein inside of the socket type light device is molded by injection so that the heat dissipation fin is accommodated within the inside of the socket type light device.

10. The light module of claim 1 wherein a connector for power-supplying from an outside source is provided on the substrate and wherein the first light function and the second light function are power-supplied through the connector.

\* \* \* \* \*